(12) United States Patent
Goyal (10) Patent No.: US 8,219,716 B2
(45) Date of Patent: Jul. 10, 2012

(54) METHODS FOR ACCOUNTING SEEK TIME OF DISK ACCESSES

(75) Inventor: Vivek Goyal, Lowell, MA (US)

(73) Assignee: Red Hat, Inc., Raleigh, NC (US)

(*) Notice: Subject to any disclaimer, the term of this patent is extended or adjusted under 35 U.S.C. 154(b) by 243 days.

(21) Appl. No.: 12/702,136

(22) Filed: Feb. 8, 2010

(65) Prior Publication Data

US 2011/0196996 A1 Aug. 11, 2011

(51) Int. Cl.
G06F 3/00 (2006.01)
G06F 13/00 (2006.01)
(52) U.S. Cl. .......................................... 710/5; 711/167
(58) Field of Classification Search .................. 710/5
See application file for complete search history.

(56) References Cited

U.S. PATENT DOCUMENTS

| | | | | |
|---|---|---|---|---|
| 5,644,786 A * | 7/1997 | Gallagher et al. | ............... | 710/30 |
| 5,828,902 A * | 10/1998 | Tanaka et al. | .................... | 710/39 |
| 6,405,282 B1 * | 6/2002 | Lam et al. | ..................... | 711/112 |
| 6,496,899 B1 * | 12/2002 | DeMoney | ..................... | 711/112 |
| 6,571,298 B1 * | 5/2003 | Megiddo | ........................... | 710/5 |
| 7,197,577 B2 * | 3/2007 | Nellitheertha | .................... | 710/6 |
| 7,471,486 B1 * | 12/2008 | Coker et al. | ............... | 360/78.06 |
| 2002/0131195 A1 * | 9/2002 | Dehnert | ..................... | 360/78.07 |

OTHER PUBLICATIONS

Domingo, Don, "Whitepapers 1.0, Red Hat Enterprise Linux 5 IO Tuning Guide," Red Hat, Inc., Raleigh, North Carolina, Sep. 23, 2008, 16 pages.

* cited by examiner

*Primary Examiner* — Henry Tsai
*Assistant Examiner* — Titus Wong
(74) *Attorney, Agent, or Firm* — Lowenstein Sandler PC (57) ABSTRACT

An input and output (IO) scheduler dispatches a first IO request from a first IO queue during a first dispatch cycle and dispatches a second IO request from a second IO queue during a second dispatch cycle to one or more disks, where the first IO request is the last remaining IO request in the first queue and the second IO request is the first overall IO request in the second queue. The first and second IO requests are selected from multiple IO requests received from one or more clients for accessing the one or more disks. A seek time monitor measures disk seek time (IO queue switch time) incurred between the first IO request and the second IO request, and determines whether the first IO request and the second IO request belong to the same group. The disk seek time is attributed to a group associated with the first IO request and the second IO request, if the first IO request and the second IO request belong to the same group. If not, then this seek time incurred during queue switch is attributed to a common ancestor of two IO queues in the IO hierarchy.

18 Claims, 6 Drawing Sheets

METHODS FOR ACCOUNTING SEEK TIME OF DISK ACCESSES

TECHNICAL FIELD

The present invention relates generally to disk access time accounting management. More particularly, this invention relates to disk seek time accounting.

BACKGROUND

On rotating media, such as hard disks, seek time can be significant. With input/output (IO) schedulers who maintain a queue per task and then try to allocate a fair share to different queues in terms of disk time used, seek time accounting to a queue becomes an issue because during queue switches, it is not clear who should be charged for seek time. A new queue may start dispatching at a distant location of a disk as compared to current disk head position, causing a significant amount of seek time but it is not fair to attribute this seek time to the new queue, as this seek time depends on where previous IO queue was doing IO. To solve this problem, IO schedulers often do not attribute the seek time to the new queue until at least a first request from the queue has finished and this seek time (e.g., seek time incurred in completing the first request from the queue) is not accounted to any of the queues.

Discarding seek time incurred during IO queue switches always, is not the best method in a hierarchical IO scheduling setup, where within a group, a user can launch multiple threads and seek time between IO queues of same group is lost. A better method is that this seek time is charged to the group to which these IO queues belong to. In extreme cases it might happen that a user with-in a group launches multiple threads and issues a bunch of sequential IO request from each thread. Each thread IO queue, may use only a part of its allocated time slice and the IO scheduler may schedule in another IO queue from same group. This IO queue switch might incur a significant amount of seek time and if such seek time is not accounted to appropriate groups, it can lead to inaccuracy in disk access time accounting, which is the parameter on which fairness and in turn quality of service (QoS) is based upon.

BRIEF DESCRIPTION OF THE DRAWINGS

The present invention is illustrated by way of example and not limitation in the figures of the accompanying drawings in which like references indicate similar elements.

DETAILED DESCRIPTION

According to some embodiments, IO requests to a disk of a data processing system are grouped into one or more groups and stored in multiple IO queues. An IO scheduler is configured to dispatch the IO requests to the disk from the IO queues. The disk seek time incurred during a current IO request and a previous request during IO queue switch is measured. This seek time is attributed to the common ancestor group of previous IO queue and new IO queue in a hierarchy of IO queues and groups. In other words, If the current IO request and the previous IO request belong to the same group, the disk seek time is attributed to the parent group associated with the current IO request and the previous IO request. If the current IO request and the previous IO request do not belong to the same group, however, we travel up the hierarchy and find common ancestor group and assign the seek time to that common ancestor. The disk seek time is used in part in determining disk access time associated with a client or clients of the IO requests, as a part of service level provided to the client or clients.

In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 1:
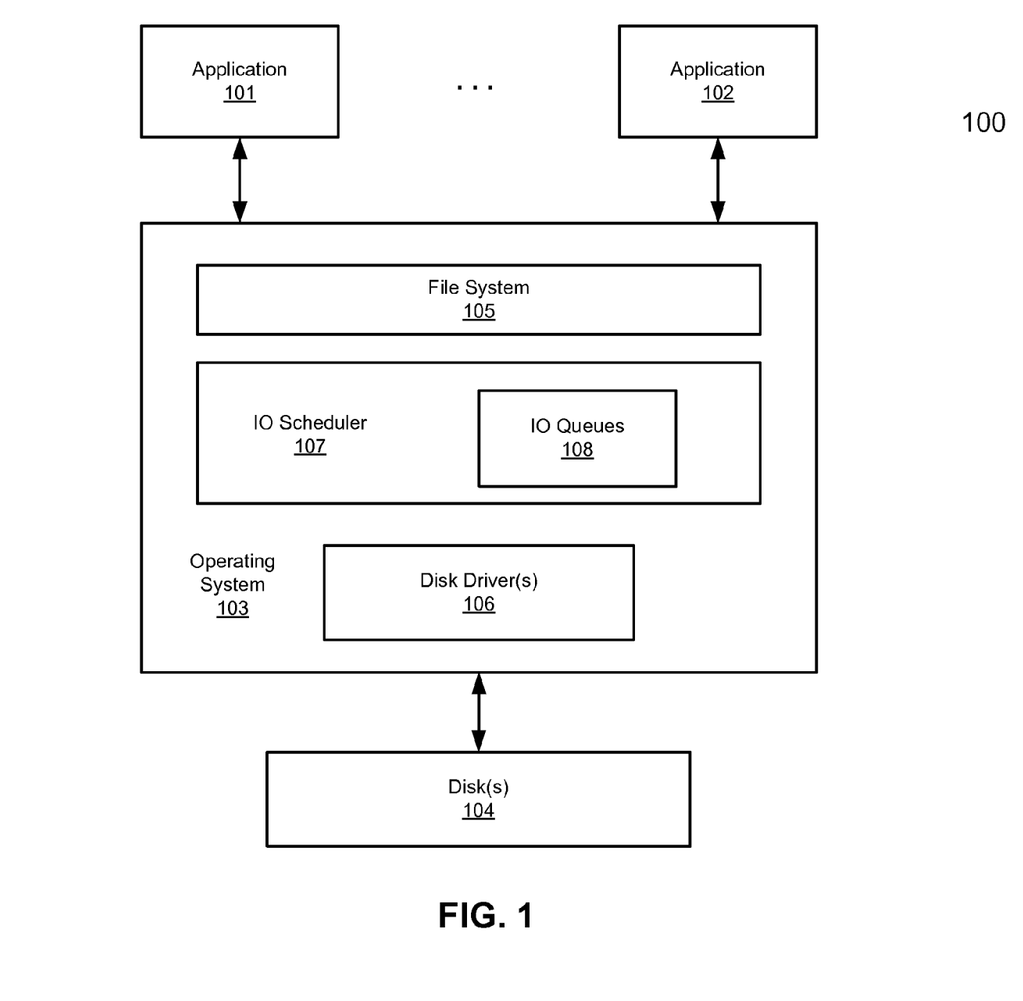
FIG. 1 is a block diagram illustrating system architecture according to one embodiment of the invention.

FIG. 1 is a block diagram illustrating system architecture according to one embodiment of the invention. The system 100 includes one or more applications 101-102, as clients, interfacing with an operating system 103. Applications 101-102 may be a local client or a remote client. Operating system 103 may be any kind of operating systems, such as, for example, LINUX available from Red Hat, Inc. of Raleigh, N.C., Windows™ available from Microsoft Corporation of Redmond, Wash., and Mac OS™ available from Apple Inc. of Cupertino, Calif., etc.

The operating system 103 includes a file system 105, which in turn interfaces with one or more storage disks 104 through one or more disk drivers 106. The operating system 103 enables user operations to access files stored in storage disk 104 via the file system 103. These operations may include read, write, open, close, etc. In one embodiment of the invention, the file system 103 includes functionality to store and retrieve data in and from the storage disk 104. Typically, a request to perform a particular operation (e.g., a transaction) is forwarded, via a system call interface, to the file system 103. The file system 103 translates the request to perform a read or write operation (e.g., an IO request) at a physical location within the storage disk 104.

Below file system, there is an IO scheduler 107, which maintains one or more 10 queues 108. The IO scheduler 107 receives IO requests and groups the IO requests into transaction groups. The grouped IO requests are stored in one or more IO queues 108. Each IO queue may be associated with a process or more than a process. The IO scheduler 107 typically includes functionality to determine when to issue (e.g., dispatch) IO requests to one or more disks 104.

IO scheduling is a term used to describe the method used by operating systems to decide the order in which block IO operations will be submitted to storage volumes. IO scheduling sometimes is referred to as disk scheduling. IO scheduling usually has to work with hard disks that require a long access time for requests which are far away from the current position of the disk head (also referred to as seek operation). To minimize the effect this has on system performance, most IO schedulers implement a variant of elevator algorithms which re-orders the incoming randomly ordered requests into an order in which they will be found on the disk.

Seek time is one of the three delays associated with reading or writing data on a computer's disk drive and somewhat similar to CD or DVD drives. The others are rotational delay and transfer time. In order to read or write data in a particular location on the disk, the read/write head of the disk needs to be physically moved o the correct place. This process is known as seeking, and the time it takes for the read/write head to move to the right place is referred to as seek time. Seek time for a given disk varies depending on how far the head's destination s from its origin at the time of each read or write instruction.

According to one embodiment, IO scheduler 107 is configured to also keep track of seek time of dispatching the IO requests from IO queues 108 during queue switch. For example, seek time incurred between the last IO request from a previous queue (e.g., first queue) and the first IO request from a next queue (e.g., second queue) is monitored or measured. In a particular embodiment, IO scheduler 107 monitors the seek time incurred during IO queue switch and attributes that seek time to a the group associated with the IO queue if previously scheduled IO queue was from same group. If the first and second queues do not belong to the same group, then we move up the IO hierarchy and seek time is attributed or accounted to a common ancestor group of two IO queues. Usually seek time incurred during queue switch is not attributed to any of the IO queues because it may not be fair to attribute the entire seek time to a queue, but it is fair to attribute the seek time to a parent group if a previous queue belongs to the same parent group. This gives a better isolation between groups and better time accounting, and a user cannot exploit the situation by creating many threads, each issuing a small amount of IO accesses.

In one embodiment, the IO scheduler 107 records the last active queue selected for dispatch in each group. During a next dispatch cycle, when a next queue is selected, parent group informs the child group whether this group is being selected again for dispatch in a row/consecutively. When the IO queue 108 has used its time slice, it passes the seek time during queue switch as well as disk slice used information to parent group. If parent group has been selected for dispatch in a row consecutively, the seek time between queues is added to the total disk usage time of the group and we don't pass this seek time to higher level entities in IO hierarchy. Otherwise, only queue disk slice used time is added to total disk time of group and seek time information is passed to higher level entities in IO hierarchy. The higher level entity/group will repeat the same procedure and will decide whether to add seek time to total time or pass it along to higher level.

The seek time for each group may be taken into consideration when calculating disk access time allocated for a client of a particular group in terms of quality of service (QoS) provided to the client (e.g., applications 101-102). For example, system 100 may be a content provider server (e.g., video stream server) to allow multiple clients to access content stored at disk 104 (e.g., video streams) on a subscription basis. If client 101 has subscribed a higher level service than client 102, client 101 deserves a longer disk access time to disk 104, which is translated into a higher access bandwidth. By monitoring the disk seek time of each queue during IO queue 107 switch and attributing this seek time at a group level, the accounting of disk access time can be determined in a more accurate manner.

Figure 2:
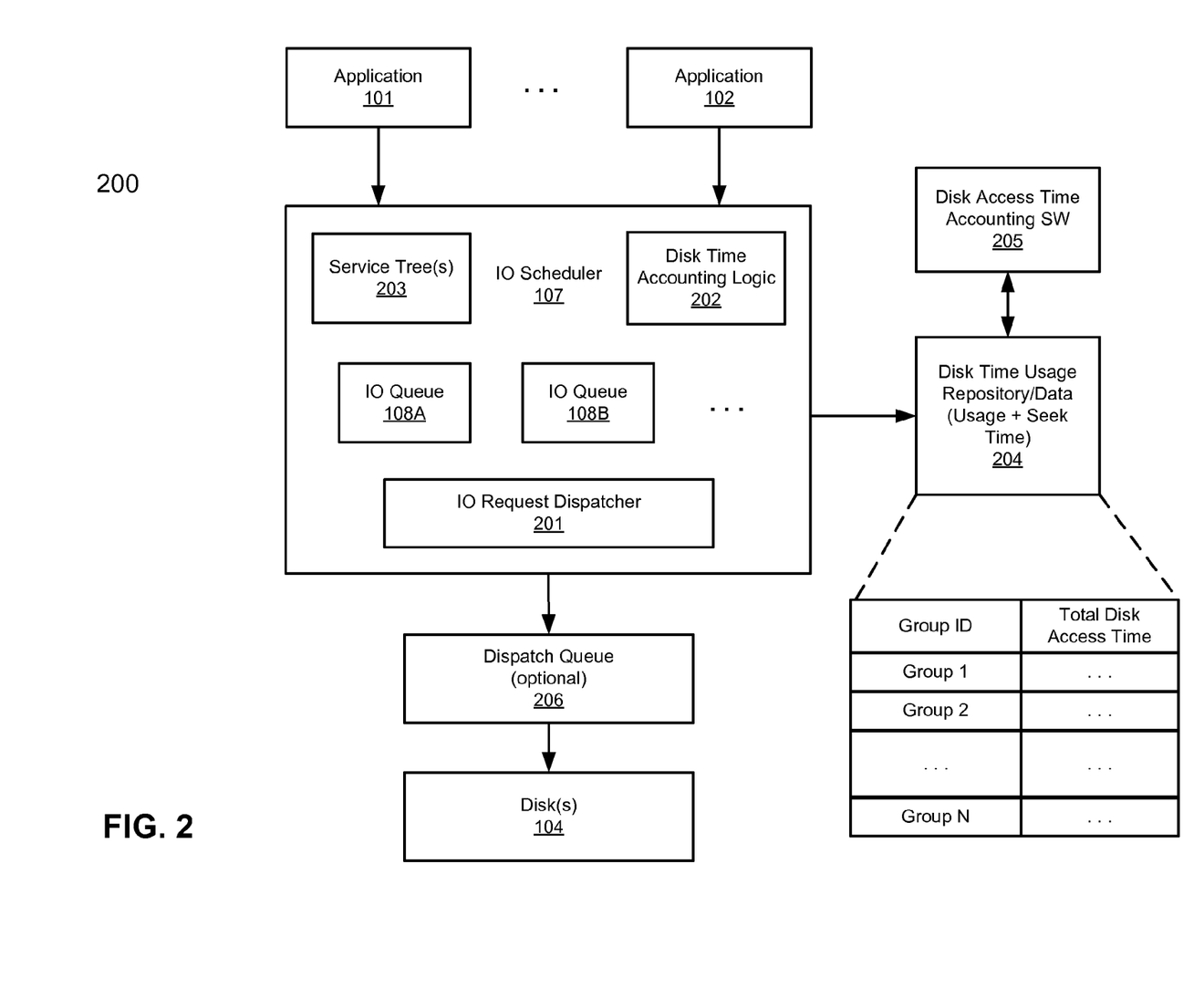
FIG. 2 is a block diagram illustrating an IO subsystem according to one embodiment.

FIG. 2 is a block diagram illustrating an IO subsystem according to one embodiment. IO subsystem 200 may be implemented as part of system 100 of FIG. 1. Referring to FIG. 2, system 200 includes one or more IO queues 108A-108B coupled to an IO scheduler 108. IO queues 108A-108B contain IO requests assigned to IO queues by IO scheduler based on a variety of parameters, such as, IO group of request, IO priority of submitting process and type of request (READ/WRITE). Grouping of the IO queues may be based on user ID, group ID, thread group, process group, or other policies, etc.

Figure 3:
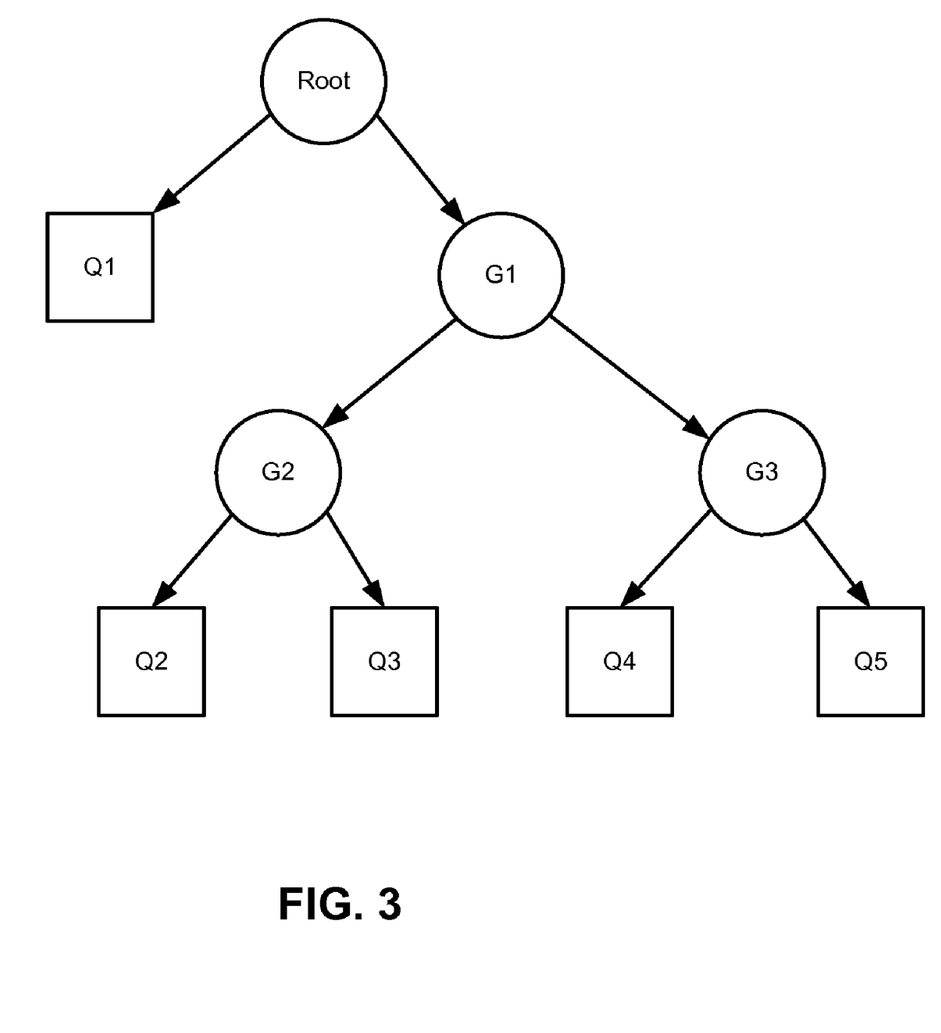
FIG. 3 is a block diagram illustrating a data structure representing a service tree according to one embodiment.

In addition, by grouping the IO requests into IO queues 108A-108B, one or more disk service trees 203 are also created, for example, by the IO scheduler. A disk service tree represents hierarchical relationships of different IO groups and IO queues and IO requests with-in IO queues. An example of such a disk service tree is shown in FIG. 3 for the purpose of illustration.

In one embodiment, IO scheduler 107 includes an IO request dispatcher 201 and a disk time usage monitor 202. IO request dispatcher 201 is configured to retrieve IO requests from IO queues 108A-108B and dispatch the IO requests to disk 104, optionally via a dispatch queue 206. The IO requests may be dispatched according to a variety of dispatch algorithms in an attempt to maximize the efficiency.

For example, IO requests may be scheduled and dispatched according to a completely fair queuing (CFQ) scheme. Under the CFQ scheme, IO scheduler 107 maintains a scalable per-process IO queue and attempts to distribute the available IO bandwidth according to IO priority among all IO queues. The CFQ scheme works by placing synchronous IO requests submitted by processes into a number of per-process queues (e.g., IO queues 108A-108B) and then allocating time slices for each of the queues to access the disk. The length of a time slice and the number of IO requests a queue is allowed to submit depends on the IO priority of the given process. Asynchronous IO requests for all processes are batched or grouped together in fewer IO queues, one per priority (e.g., idle, best effort, and real time priorities). During each dispatch cycle, IO requests are moved from each non-empty IO queue into a dispatch queue (e.g., dispatch queue 206 in a round-robin fashion. Once in the dispatch queue, IO requests are ordered to minimize disk seeks and serviced accordingly. Other scheduling schemes, such as deadline elevator, NOOP scheduling, and anticipatory elevator schemes may also be utilized.

Referring back to FIG. 2, disk access time accounting logic 202 is configured to monitor and keep track with the seek time incurred during IO queue switch and attempt to attribute the seek time at a group level, which is stored in a Disk usage time repository 204. In one embodiment, disk access time accounting logic 202 monitors the seek time incurred during IO queue switch (e.g. 108B) and to attributes that seek time to a group associated with the IO queue if previous IO queue (e.g., queue 108A) selected for dispatch belongs to the same group. If the first and second queues do not belong to the same group, the seek time is attributed or accounted to a common ancestor group in the IO hierarchy.

In one embodiment, the IO scheduler 107 records the last active queue selected for dispatch in each group. During a next dispatch cycle, when a next queue is selected, parent group informs the child group whether this group is being selected again for dispatch in a row/consecutively. When the IO queue 108 has used its time slice, disk time accounting logic 202 passes the seek time during queue switch as well as disk slice used information to parent group. If parent group has been selected for dispatch in a row consecutively, the seek time between queues is added to the total disk usage time of the group and we don't pass this seek time to higher level entities in IO hierarchy. Otherwise, only queue disk slice used time is added to total disk time of group and seek time information is passed to higher level entities in IO hierarchy. The higher level entity/group will repeat the same procedure and will decide whether to add seek time to total time or pass it along to higher level.

Referring to FIG. 3, which is a block diagram illustrating an example of a data structure representing a service tree according to one embodiment, the service tree shown in FIG. 3 may be constructed by IO scheduler 107 of FIG. 1 when IO scheduler 107 distributes or assigns IO requests into IO queues 108A-108B. In this example, referring to FIG. 3, the root group is associated with queue Q1 and a child group G1. Group G1 includes child groups G2 and G3 (e.g., G1 is a parent group of groups G2 and G3). Group G2 is associated with queues Q2 and Q3, while Group G3 is associated with queues Q4 and Q5.

In one embodiment, for the purpose of illustration, it is assumed that during a first dispatch cycle, the IO scheduler dispatches an IO request from Q2 and during a second dispatch cycle, the IO scheduler dispatches an IO request from Q3. During the first and second dispatch cycles, there will be a seek time incurred between queues Q2 and Q3, which is monitored by disk usage time account logic 202. Since queues Q2 and Q3 are associated with the same group G2, this seek time should be attributed to group G2.

According to another embodiment, for the purpose of illustration, it is assumed that during a first dispatch cycle, if the IO dispatches a first IO request from Q2 and during a second dispatch cycle, the IO scheduler dispatches second IO request from Q4. In this example, since Q2 and Q4 are associated with different groups (e.g., G2 and G3) at the same level, the seek time cannot attributed to either group G2 or G3. However, since groups G2 and G3 belong to the same parent group G1, the seek time incurred should be attributed to group G1.

Figure 4:
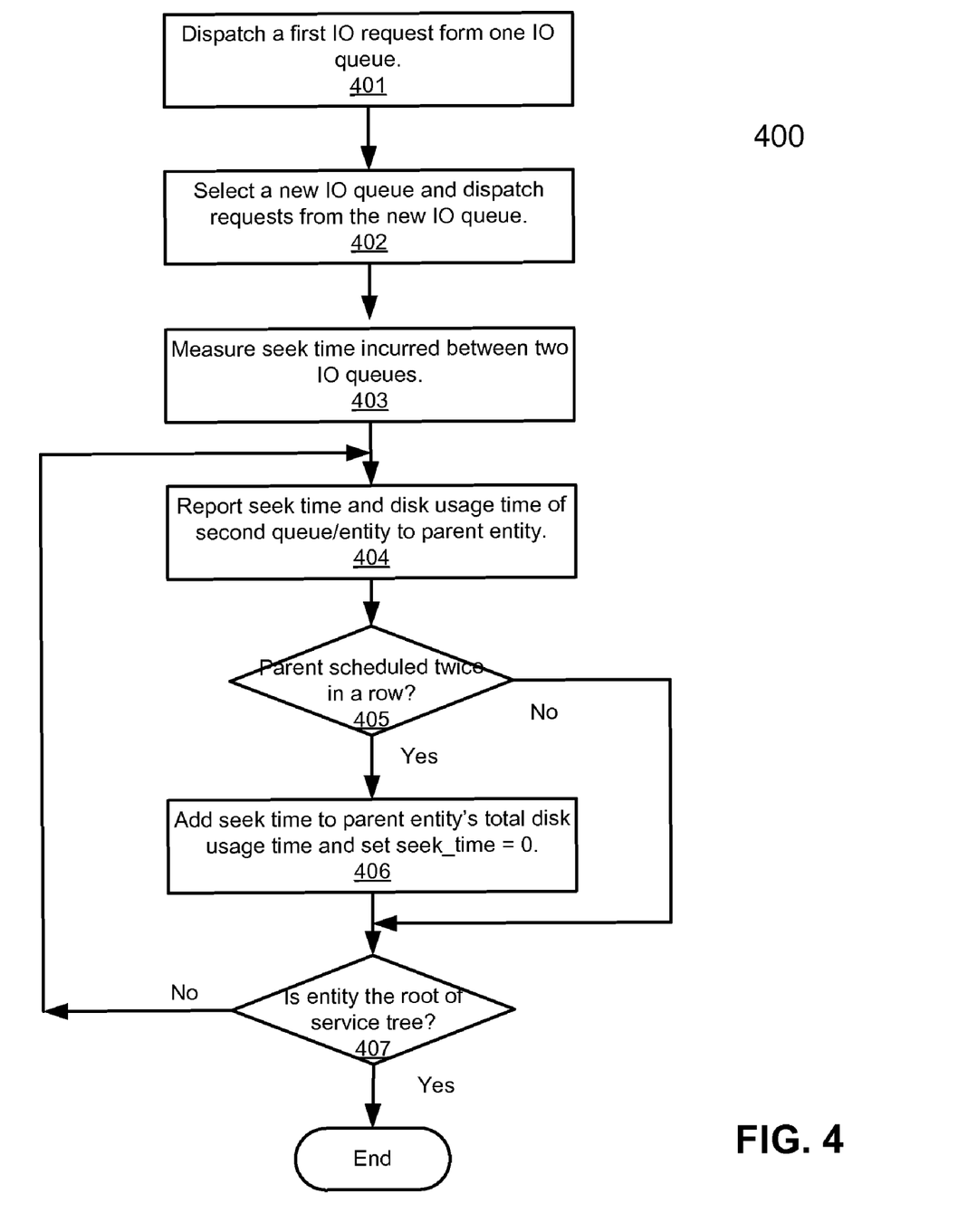
FIG. 4 is a flow diagram illustrating a method for accounting seek time of disk accesses according to one embodiment.

FIG. 4 is a flow diagram illustrating a method for accounting seek time of disk accesses incurred during queue switch according to one embodiment. Note that method 400 may be performed by processing logic which may include software, firmware, hardware, or a combination thereof. For example, method 400 may be performed by IO scheduler 107 of FIG. 1. Referring to FIG. 4, at block 401, some IO request are dispatched from a first IO queue for accessing a disk. At block 402, a second IO request is dispatched from a second IO queue. At block 403, seek time is measured between the first IO request and the second IO request. At block 404, this seek time, along with actual disk usage time by the queue is reported to parent entity. At block 405, a decision is made whether this entity/group has been scheduled twice in a row/consecutively. If yes, at block 406 the seek time is attributed to the parent entity/group and seek time incurred between queue switches is set to zero and not passed to higher level entities. If parent has not been scheduled twice in a row, that means previous queue did not belong to same group/entity. In that case one goes one level up in the hierarchy and reports seek time and disk usage time by lower level entity and process in block 404 is repeated. Before traversing up in the hierarchy, at block 407, a check is made to see if we have reached the root of the tree. If yes, the loop exits.

Figure 5:
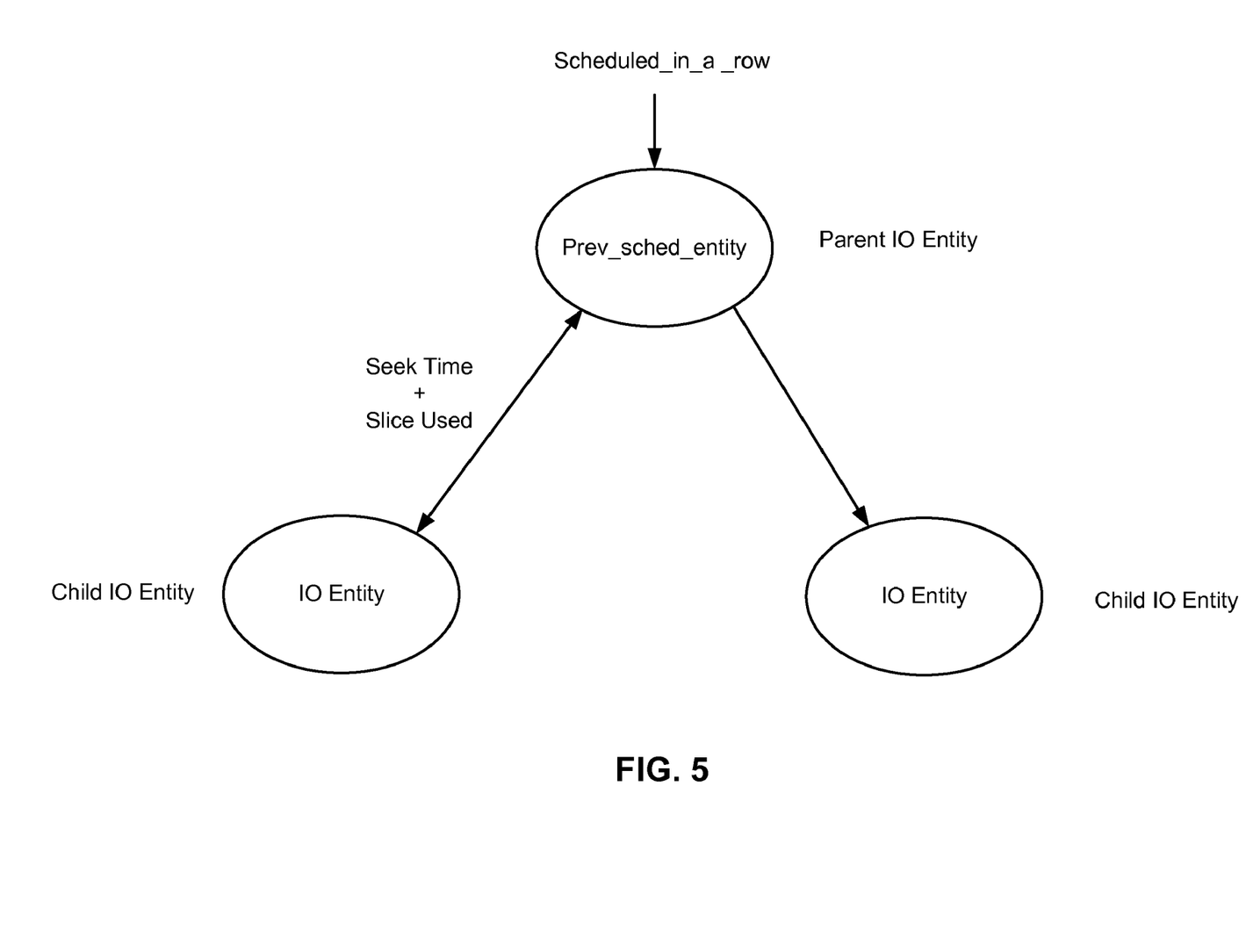
FIG. 5 is a flow diagram illustrating a method for determining whether an entity has been scheduled twice in a row according to one embodiment.

FIG. 5 is a flow diagram illustrating a method for determining whether an entity has been scheduled twice in a row according to one embodiment. For example, the method as shown in FIG. 5 may be performed as a part of operations involved in block 405 of FIG. 4. In one embodiment, referring to FIG. 5, each IO entity node keeps track of a previously scheduled entity (e.g., prev_sched_entity). While selecting a new entity for scheduling among its children, this node checks if the newly selected entity is same as a previously selected entity and if yes, it passes that information to a child node indicating that the child node has been selected twice in a row (e.g., scheduled_in_a_row). If a node has not been selected twice in a row, then it will reset the prev_sched_entity information and schedule all children node with scheduled_in_a_row=0. Upon an IO queue expires, a parent entity receives a disk seek time (e.g., queue switch time) and a slice used by the IO queue. If a node has been scheduled in with scheduled_in_a_row=1, then it adds the seek time component to a total disk access time and resets seek time; otherwise the seek time is passed to a parent entity.

Figure 6:
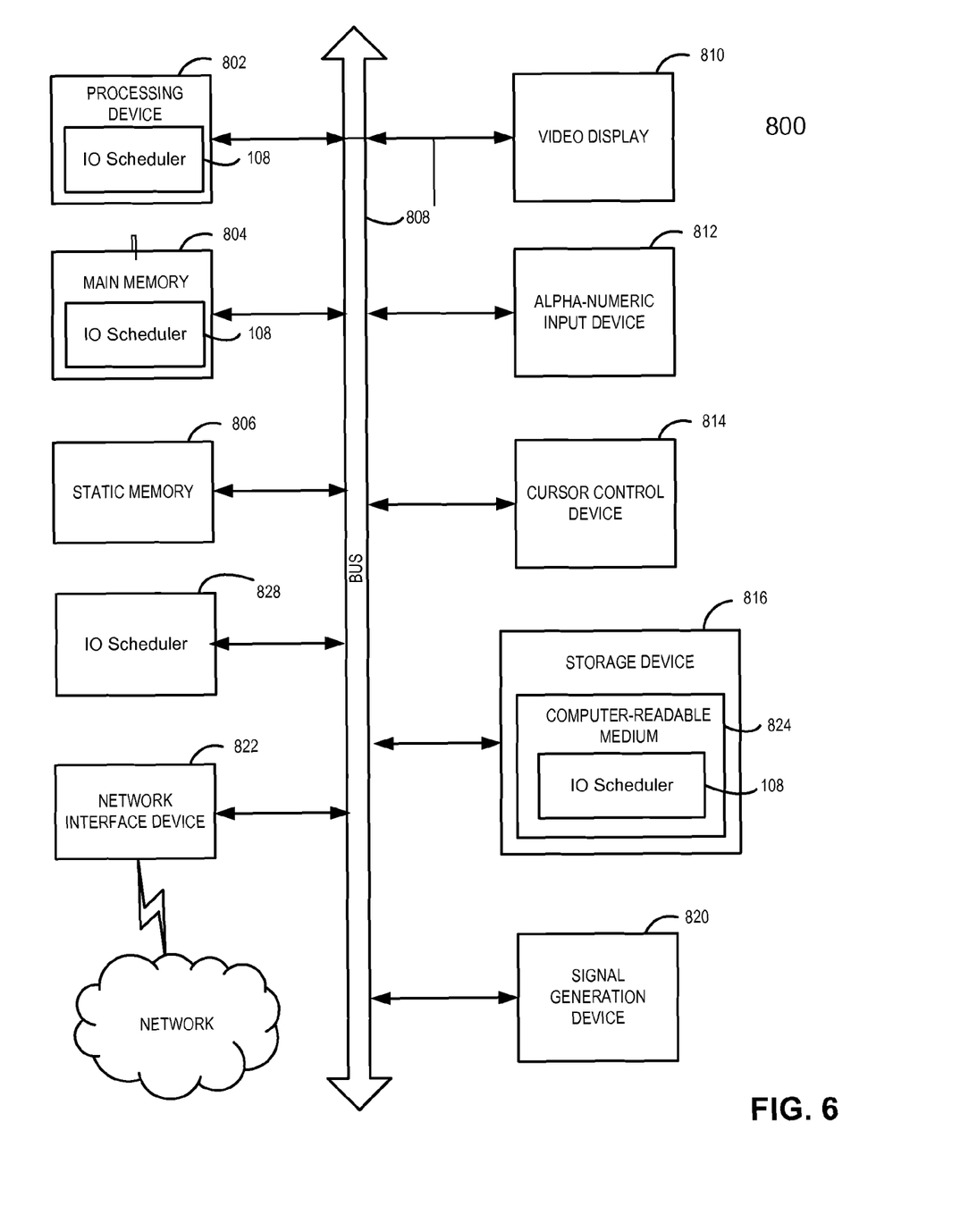
FIG. 6 is a block diagram illustrating a data processing system which may be used with an embodiment of the invention.

FIG. 6 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a data storage device 816, which communicate with each other via a bus 808.

Processor 802 represents one or more general-purpose processors such as a microprocessor, a central processing unit, or the like. More particularly, the processor may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 802 may also be one or more special-purpose processors such as an application specific integrated circuit (ASIC), a field programmable gate array (FPGA), a digital signal processor (DSP), network processor, or the like. The processor 802 is configured to execute the instructions 108 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a computer-accessible storage medium 824 (also known as a machine-readable storage medium or a computer-readable medium) on which is stored one or more sets of instructions or software (e.g., IO scheduler 108) embodying any one or more of the methodologies or functions described herein. The IO scheduler 108 may also reside, completely or at least partially, within the main memory 804 and/or within the processor 802 during execution thereof by the computer system 800, the main memory 804 and the processor 802 also constituting machine-accessible storage media. The IO scheduler 108 may further be transmitted or received over a network via the network interface device 822.

The computer-readable storage medium 824 may also be used to store the IO scheduler 108 persistently. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The modules 828, components and other features described herein can be implemented as discrete hardware components or integrated in the functionality of hardware components such as ASICS, FPGAs, DSPs or similar devices. In addition, the modules 828 can be implemented as firmware or functional circuitry within hardware devices. Further, the modules 828 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A method comprising:
dispatching to one or more disks, by a computer system, a first IO request from a first IO queue during a first dispatch cycle, the first IO request being the last remaining IO request dispatched from the first IO queue;
dispatching to the one or more disks, by the computer system, a second IO request from a second IO queue during a second dispatch cycle, the second IO request being the first overall IO request to be dispatched from the second IO queue, wherein the first and second IO requests are selected from a plurality of IO requests received from one or more clients for accessing the one or more disks;
measuring, by the computer system, disk seek time incurred between the first IO request and the second IO request;
determining whether the first IO request and the second IO request belong to different groups;
attributing, by the computer system, the disk seek time to a group associated with the first IO request and second IO request when the first IO request and the second IO request do not belong to different groups; and
attributing, by the computer system, the disk seek time to a common ancestor of the first IO queue and the second IO queue when the first IO request and the second IO request belong to different groups.

2. The method of claim 1, further comprising:
grouping the plurality of IO requests into a plurality of groups in a hierarchical structure;
distributing the plurality of IO requests into a plurality of IO queues based on characteristics of the one or more disks being accessed; and
generating a service tree representing the hierarchical structure, each node of the service tree representing a group associated with one or more IO queues in which one or more IO requests of the group are distributed.

3. The method of claim 2, further comprising:
determining, based on the service tree, whether a first group associated with the first IO request and a second group associated with the second IO request is associated with a common parent group; and
attributing the disk seek time to the common parent group.

4. The method of claim 3, further comprising attributing the disk seek time to a parent group of the second group when the first group and the second group are associated with different parent groups.

5. The method of claim 4, further comprising:
determining whether the parent group of the second group has been scheduled twice in a row; and
attributing the disk seek time to a total disk usage time of the parent of the second group.

6. The method of claim 1, wherein the disk seek time of each group is used to account disk access time of the one or more disks for a client associated with each group in determining a service level of the client.

7. A non-transitory computer readable storage medium including instructions that, when executed by a computer system, cause the computer system to perform a method, the method comprising:
dispatching to one or more disks, by the computer system, a first IO request from a first IO queue during a first dispatch cycle, the first IO request being the last remaining IO request dispatched from the first IO queue;
dispatching to the one or more disks, by the computer system, a second IO request from a second IO queue during a second dispatch cycle, the second IO request being the first overall IO request to be dispatched from the second IO queue, wherein the first and second IO requests are selected from a plurality of IO requests received from one or more clients for accessing the one or more disks;
measuring, by the computer system, disk seek time incurred between the first IO request and the second IO request;
determining whether the first IO request and the second IO request belong to different groups;
attributing, by the computer system, the disk seek time to a group associated with the first IO request and second IO request when the first IO request and the second IO request do not belong to different groups; and
attributing, by the computer system, the disk seek time to a common ancestor of the first IO queue and the second IO queue when the first IO request and the second IO request belong to different groups.

8. The non-transitory computer readable storage medium of claim 7, wherein the method further comprises:
grouping the plurality of IO requests into a plurality of groups in a hierarchical structure;
distributing the plurality of IO requests into a plurality of IO queues based on characteristics of the one or more disks being accessed; and
generating a service tree representing the hierarchical structure, each node of the service tree representing a group associated with one or more IO queues in which one or more IO requests of the group are distributed.

9. The non-transitory computer readable storage medium of claim 8, wherein the method further comprises:
determining, based on the service tree, whether a first group associated with the first IO request and a second group associated with the second IO request is associated with a common parent group; and
attributing the disk seek time to the common parent group when the first group and the second group are associated with the same parent group.

10. The non-transitory computer readable storage medium of claim 9, wherein the method further comprises attributing the disk seek time to a parent group of the second group when the first and second IO requests do not belong to the same group and the first group and the second group are associated with the same parent group.

11. The non-transitory computer readable storage medium of claim 10, wherein the method further comprises:
determining whether the parent group of the second group has been scheduled twice in a row; and
attributing the disk seek time to a total disk usage time of the parent of the second group.

12. The non-transitory computer readable storage medium of claim 7, wherein the disk seek time of each group is used to account disk access time of the one or more disks for a client associated with each group in determining a service level of the client.

13. A system comprising:
a memory to store a first input/output (IO) queue and a second IO queue; and
a processor to:
dispatch a first IO request from a first IO queue to one or more disks during a first dispatch cycle, wherein the first IO request is the last remaining IO request from the first IO queue;
dispatch a second IO request from a second IO queue during a second dispatch cycle, wherein the second IO request is the first overall IO request from the second IO queue, and wherein the first and second IO requests are selected from a plurality of IO requests received from one or more clients for accessing the one or more disks;
measure disk seek time incurred between the first IO request and the second IO request;
determine whether the first IO request and the second IO request belong to different groups;
attribute the disk seek time to a group associated with the first IO request and second IO request when the first IO request and the second IO request do not belong to different groups; and
attribute the disk seek time to a common ancestor of the first IO queue and the second IO queue when the first IO request and the second IO request belong to different groups.

14. The system of claim 13, wherein the processor is also to:
group the plurality of IO requests into a plurality of groups in a hierarchical structure,
distribute the plurality of IO requests into a plurality of IO queues based on characteristics of the one or more disks being accessed, and
generate a service tree representing the hierarchical structure, each node of the service tree representing a group associated with one or more IO queues in which one or more IO requests of the group are distributed.

15. The system of claim 14, wherein the processor is also to:
    determine, based on the service tree, whether a first group associated with the first IO request and a second group associated with the second IO request are associated with a common parent group, and
    attribute the disk seek time to the common parent group.

16. The system of claim 15, wherein the processor is also to: attribute the disk seek time to a parent group of the second group when the first group and the second group are associated with different parent groups.

17. The system of claim 16, wherein the processor is also to: attribute the disk seek time to a total disk usage time of the parent of the second group when the parent of the second group has been scheduled twice in a row.

18. The system of claim 13, wherein the disk seek time of each group is used to account disk access time of the one or more disks for a client associated with each group in determining a service level of the client.

* * * * *